United States Patent
Lipkin

(10) Patent No.: US 12,481,016 B2
(45) Date of Patent: Nov. 25, 2025

(54) SYSTEMS AND METHODS FOR DETERMINING POSITION AND/OR DIRECTION OF AN EMITTER

(71) Applicant: Elta Systems Ltd., Ashdod (IL)

(72) Inventor: Yiftah Lipkin, Kfar Saba (IL)

(73) Assignee: Elta Systems Ltd., Ashdod (IL)

( * ) Notice: Subject to any disclaimer, the term of this patent is extended or adjusted under 35 U.S.C. 154(b) by 242 days.

(21) Appl. No.: 18/246,208

(22) PCT Filed: Aug. 30, 2021

(86) PCT No.: PCT/IL2021/051057
§ 371 (c)(1),
(2) Date: Mar. 22, 2023

(87) PCT Pub. No.: WO2022/064477
PCT Pub. Date: Mar. 31, 2022

(65) Prior Publication Data
US 2023/0358842 A1 Nov. 9, 2023

(30) Foreign Application Priority Data
Sep. 23, 2020 (IL) .......................................... 277536

(51) Int. Cl.
*G01S 3/46* (2006.01)
*G01S 3/04* (2006.01)
*G01S 5/06* (2006.01)
*H01Q 1/27* (2006.01)

(52) U.S. Cl.
CPC ................ *G01S 3/46* (2013.01); *G01S 3/043* (2013.01); *G01S 5/06* (2013.01); *H01Q 1/27* (2013.01)

(58) Field of Classification Search
CPC .. G01S 3/46; G01S 3/043; G01S 5/06; H01Q 1/27
USPC ......................................................... 342/465
See application file for complete search history.

(56) References Cited

U.S. PATENT DOCUMENTS

| | | | |
|---|---|---|---|
| 4,975,710 A | 12/1990 | Baghdady | |
| 6,002,360 A | 12/1999 | Wolcott et al. | |
| 8,253,638 B2 | 8/2012 | Siemsen et al. | |
| 12,212,049 B2 * | 1/2025 | Kurz | ..................... G01S 7/4004 |
| 2005/0206573 A1 | 9/2005 | Iigusa et al. | |
| 2007/0063911 A1 | 3/2007 | Davidson et al. | |

(Continued)

FOREIGN PATENT DOCUMENTS

| | | | | |
|---|---|---|---|---|
| CN | 1700516 A | 11/2005 | | |
| FR | 3023379 A1 * | 1/2016 | ............. | G01S 19/17 |

(Continued)

*Primary Examiner* — Harry K Liu
(74) *Attorney, Agent, or Firm* — Ballard Spahr LLP

(57) ABSTRACT

A system comprises an array of antennas suitable for intercepting electromagnetic waves, one or more sensors, wherein said one or more sensors are configured to provide data informative of a position of each of a plurality of the antennas over time, wherein each of a plurality of the antennas is linked to a non-rigid portion, thereby undergoing displacement upon displacement of the non-rigid portion, wherein data informative of the electromagnetic waves intercepted by the array and data informative of the position of the plurality of antennas over time are usable for determining data informative of at least one of a position and a direction of at least one emitter of the electromagnetic waves.

19 Claims, 9 Drawing Sheets

(56) References Cited

U.S. PATENT DOCUMENTS

| | | |
|---|---|---|
| 2010/0045555 A1 | 2/2010 | Ryou et al. |
| 2012/0319895 A1 | 12/2012 | Bruchiel |
| 2013/0120202 A1 | 5/2013 | Lever et al. |
| 2017/0254877 A1* | 9/2017 | Yoon .................... G01S 5/0264 |
| 2020/0072982 A1 | 3/2020 | Clymer |

FOREIGN PATENT DOCUMENTS

| | | | |
|---|---|---|---|
| GB | 2572769 | A | 10/2019 |
| IL | 222095 | A | 3/2014 |
| JP | 2005249629 | A | 9/2005 |
| JP | 2012090253 | A | 5/2012 |
| KR | 20040016492 | A | 2/2004 |
| WO | 2017155574 | A1 | 9/2017 |
| WO | 2020167897 | A1 | 8/2020 |
| WO | 2022064477 | A1 | 3/2022 |

* cited by examiner

SYSTEMS AND METHODS FOR DETERMINING POSITION AND/OR DIRECTION OF AN EMITTER

TECHNICAL FIELD

The presently disclosed subject matter relates to the field of direction-finding and geo-location, and, in particular, for determining a position and/or a direction of an emitter, such as a radio emitter.

BACKGROUND

In various applications, it is required to determine position and/or direction of an emitter. The emitter can correspond e.g. to a radio emitter used e.g. as a search-and-rescue beacon.

There is now a need to provide new methods and systems for determining position and/or direction of an emitter.

GENERAL DESCRIPTION

In accordance with certain aspects of the presently disclosed subject matter, there is provided a system adapted to be mounted on a platform, the system comprising an array of antennas suitable for intercepting electromagnetic waves, one or more sensors, wherein said one or more sensors are configured to provide data informative of a position of each of a plurality of the antennas over time, wherein each of a plurality of the antennas is linked to a non-rigid portion, thereby undergoing displacement upon displacement of the non-rigid portion, wherein data informative of the electromagnetic waves intercepted by the array and data informative of the position of the plurality of antennas over time are usable for determining data informative of at least one of a position and a direction of at least one emitter of the electromagnetic waves.

In addition to the above features, the system according to this aspect of the presently disclosed subject matter can optionally comprise one or more of features (i) to (x) below, in any technically possible combination or permutation:
i. the one or more sensors are operative in space;
ii. at least one sensor is configured to provide data informative of a position of an antenna based on data informative of the electromagnetic waves intercepted by said antenna;
iii. each antenna of the array of antennas is linked to a non-rigid portion;
iv. a displacement of a non-rigid portion to which an antenna is linked has an amplitude, during a given period of time, which is equal to or greater than half a wavelength of the electromagnetic waves to be intercepted by the antenna during said given period of time;
v. a mechanism allows control of a motion of one or more of the plurality of antennas, wherein the system is configured to induce, by the mechanism, a motion of one or more of the antennas over time;
vi. the system is operatively coupled to a mechanism controllable to displace the array of antennas from a first geometry to a second geometry, different from the first geometry;
vii. the first geometry corresponds to a stowed geometry and the second geometry corresponds to an expanded geometry, or conversely;
viii. the system is configured to send a command to a mechanism to displace the array of antennas from a first geometry to a second geometry, different from the first geometry, wherein an error in a position of at least one antenna in the second geometry, with respect to a position of said at least one antenna specified in the command, is equal to or greater than half a wavelength of the electromagnetic waves to be intercepted by said at least one antenna;
ix. the system is operable to communicate with a processing unit and associated memory configured to determine at least one of a position and direction of at least one emitter of the electromagnetic waves based on a difference between at least one of the physical characteristics of the electromagnetic waves intercepted by the plurality of antennas, and data informative of the position of each antenna over time; and
x. the platform includes at least one of an airborne vehicle, a space-borne vehicle, a ground system, a ground vehicle, and a water-borne vehicle.

In accordance with other aspects of the presently disclosed subject matter, there is provided a system adapted to be mounted on a platform, the system comprising an array of antennas suitable for intercepting electromagnetic waves, wherein the system is operatively coupled to a mechanism controllable to displace at least one antenna of the array relative to another antenna of the array or relative to the platform, one or more sensors, wherein said one or more sensors are configured to provide data informative of a position over time of each of a plurality of the antennas, wherein data informative of the electromagnetic waves intercepted by the array and data informative of the position of the plurality of antennas over time are usable for determining data informative of at least one of a position and a direction of at least one emitter of the electromagnetic waves.

In addition to the above features, the system according to this aspect of the presently disclosed subject matter can optionally comprise one or more of features (xi) to (xv) below, in any technically possible combination or permutation:
xi. the system is configured to send a command to the mechanism to displace at least one antenna of the array relative to another antenna of the array or relative to the platform;
xii. the system is configured to induce, by the mechanism, a periodic or secular motion of one or more of the antennas, to resolve an ambiguity present in determining data informative of at least one of a position and a direction of the at least one emitter of the electromagnetic waves;
xiii. the system is configured to send a command to the mechanism to displace at least one antenna of the array from a current position to a position specified in the command, wherein an error between a position reached by the antenna and the position specified in the command is equal to or greater than half a wavelength of the electromagnetic waves to be intercepted by said at least one antenna;
xiv. the system is configured to send a command to the mechanism to displace the array of antennas from a first geometry to a second geometry, different from the first geometry; and
xv. at least one antenna is linked to a non-rigid portion, thereby undergoing displacement upon displacement of the non-rigid portion.

In accordance with other aspects of the presently disclosed subject matter, there is provided a method comprising obtaining data informative of electromagnetic waves intercepted by an array of antennas mounted on a platform, wherein each of a plurality of the antennas is linked to a non-rigid portion, thereby undergoing displacement upon displacement of the non-rigid portion, obtaining data informative of a position of each of the plurality of the antennas over time, and based on data informative of the electromagnetic waves intercepted by the array of antennas and the data informative of the position of the plurality of antennas over time, determining data informative of at least one of a position and a direction of at least one emitter of the electromagnetic waves.

In addition to the above features, the method according to this aspect of the presently disclosed subject matter can optionally comprise one or more of features (xvi) to (xxv) below, in any technically possible combination or permutation:

xvi. the one or more sensors are operative in space;
xvii. at least one sensor is configured to provide data informative of a position of an antenna based on data informative of the electromagnetic waves intercepted by said antenna;
xviii. each antenna of the array of antennas is linked to a non-rigid portion;
xix. a displacement of a non-rigid portion to which an antenna is linked has an amplitude, during a given period of time, which is equal to or greater than half a wavelength of the electromagnetic waves to be intercepted by the antenna during said given period of time;
xx. the method comprises inducing, by a mechanism, a motion of one or more of the plurality of antennas over time;
xxi. the method comprises displacing the array of antennas from a first geometry to a second geometry, different from the first geometry;
xxii. the first geometry corresponds to a stowed geometry and the second geometry to an expanded geometry, or conversely;
xxiii. the method comprises sending a command to a mechanism to displace the array of antennas from a first geometry to a second geometry, different from the first geometry, wherein an error in a position of at least one antenna in the second geometry, with respect to a position of said at least one antenna specified in the command, is equal to or greater than half a wavelength of the electromagnetic waves to be intercepted by said at least one antenna;
xxiv. the method comprises determining at least one of a position and direction of at least one emitter of the electromagnetic waves based on a difference between at least one of the physical characteristics of the electromagnetic waves intercepted by the plurality of antennas, and data informative of the position of each antenna over time; and
xxv. the platform includes at least one of an airborne vehicle, a space-borne vehicle, a ground system, a ground vehicle, and a water-borne vehicle.

In accordance with other aspects of the presently disclosed subject matter, there is provided a method comprising using a mechanism to displace at least one antenna of an array of antennas mounted a platform, relative to another antenna of the array or relative to the platform, obtaining data informative of electromagnetic waves emitted by at least one emitter and intercepted by the array of antennas, obtaining data informative of the position of each of a plurality of the antennas of the array over time, wherein data informative of the electromagnetic waves and data informative of the position of the plurality of antennas over time are usable for determining data informative of at least one of a position and a direction of at least one emitter of the electromagnetic waves.

In addition to the above features, the method according to this aspect of the presently disclosed subject matter can optionally comprise one or more of features (xxvi) to (xxx) below, in any technically possible combination or permutation:

xxvi. the method comprises sending a command to the mechanism to displace at least one antenna of the array relative to another antenna of the array or relative to the platform;
xxvii. the method comprises inducing, by the mechanism, a periodic or secular motion of one or more of the antennas, to resolve an ambiguity present in determining data informative of at least one of a position and a direction of the at least one emitter of the electromagnetic waves;
xxviii. the method comprises sending a command to the mechanism to move at least one antenna of the array from a current position to a position specified in the command, wherein an error between a position reached by the antenna and the position specified in the command is equal to or greater than half a wavelength of the electromagnetic waves to be intercepted by said at least one antenna;
xxix. the method comprises sending a command to the mechanism to displace the array of antennas from a first geometry to a second geometry, different from the first geometry; and
xxx. at least one antenna is linked to a non-rigid portion, thereby undergoing displacement upon displacement of the non-rigid portion.

In accordance with other aspects of the presently disclosed subject matter, there is provided a non-transitory computer readable medium comprising instructions that, when executed by a processing unit and associated memory, cause the processing unit and associated memory to perform operations comprising obtaining data informative of electromagnetic waves intercepted by an array of antennas mounted on a platform, wherein each of a plurality of the antennas is linked to a non-rigid portion, thereby undergoing displacement upon displacement of the non-rigid portion, obtaining data informative of a position of each of the plurality of the antennas over time, and based on the data informative of the electromagnetic waves intercepted by the array of antennas and the data informative of the position of the plurality of antennas over time, determining data informative of at least one of a position and a direction of at least one emitter of the electromagnetic waves.

According to some embodiments, the operations can optionally comprise one or more of features (xvi) to (xxv) above, in any technically possible combination or permutation.

In accordance with other aspects of the presently disclosed subject matter, there is provided a non-transitory computer readable medium comprising instructions that, when executed by a processing unit and associated memory, cause the processing unit and associated memory to perform operations comprising—obtaining data informative of electromagnetic waves intercepted by an array of antennas mounted on a platform, wherein a mechanism is operative to move at least one antenna of the array relative to another antenna of the array or relative to the platform, obtaining data informative of a position of each of a plurality of the antennas over time, and based on the data informative of the electromagnetic waves intercepted by the array of antennas and the data informative of the position of the plurality of antennas over time, determining data informative of at least one of a position and a direction of at least one emitter of the electromagnetic waves.

According to some embodiments, the operations can optionally comprise one or more of features (xxvi) to (xxx) above, in any technically possible combination or permutation.

According to some embodiments, the proposed solution allows use of a non-rigid array of antennas, in order to determine a position and/or a direction of an emitter.

According to some embodiments, the proposed solution allows sparing weight, which is beneficial for various applications, such as space applications. In particular, less massive structures can be used to implement the array of antennas.

According to some embodiments, the proposed solution reduces cost, as well as complexity, and facilitates design and manufacturing of the array.

According to some embodiments, the proposed solution relaxes the conventional requirement to implement a rigid array having a fixed and pre-defined geometry.

According to some embodiments, for a given mass, or a given cost, the proposed solution provides a non-rigid array which is larger than a rigid array, thereby improving determination of a position and/or a direction of the emitter.

According to some embodiments, the proposed solution provides a large (or very large) array of antennas, thereby improving accuracy of the localization and/or of the direction-finding.

According to some embodiments, the proposed solution allows determination of the position and/or direction of the emitter, even if the antennas undergo a motion or a vibration of large amplitude.

According to some embodiments, the proposed solution benefits from random variations of antenna positions in order to resolve ambiguous locations and/or directions derived from data sensed by the antennas.

According to some embodiments, vibrations and/or motion can be intentionally induced in order to resolve ambiguities.

According to some embodiments, the proposed solution provides a deployable array of antennas which provides several advantages with respect to existing solutions.

According to some embodiments, the proposed solution avoids the use of sophisticated and costly mechanisms for deploying an accurate and repeatable large array of antennas.

In particular, the proposed solution allows using a mechanism for deploying an array of antennas at predefined positions that can have a low or even unbounded accuracy for reaching these predefined positions.

A mechanism with a high accuracy would require, for the same array size, greater investment of resources (e.g. better materials, higher weight, higher complexity and cost, and greater design efforts), or alternatively, investing similar resources would suffice for an array of smaller dimensions. According to some embodiments, the proposed solution provides a deployable array, which is lighter, less complex, and involves smaller design and manufacturing costs.

According to some embodiments, the proposed solution provides a deployable array which, in a deployed position, can have a larger dimension than a rigid array of the same weight or cost.

According to some embodiments, the proposed solution is particularly beneficial for deploying a large array of antennas on a satellite, for which constraints, related in particular to the launch of the satellite, cause difficulties to obtain a large array.

In particular, a large array of antennas can be deployed in a simpler and efficient way, which copes with strict requirements, such as, but not limited to, of satellite launching.

According to some embodiments, the proposed solution allows constructing an array of antennas in which the distance between the antennas can be controlled over time, thereby providing an in-mission real-time adaption to the frequency to be detected and/or to the required accuracy, while still allowing determination of the position and/or the direction of the emitter.

According to some embodiments, the proposed solution provides a large array of antennas on a single platform thereby providing efficient determination of the emitter's position and/or direction without requiring the use of a constellation of platforms.

BRIEF DESCRIPTION OF THE DRAWINGS

In order to understand the invention and to see how it can be implemented in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "sensing", "intercepting", "receiving", "determining", "sending", or the like, refer to the action(s) and/or process(es) of a processing unit that manipulate and/or transform data into other data, said data represented as physical, such as electronic, quantities and/or said data representing the physical objects.

Unless specifically stated otherwise, as apparent from the following discussions, it is appreciated that throughout the specification discussions utilizing terms such as "non-rigid" or "flexible" refer to a body for which, when a force is applied to the body, the force distorts shape and/or size of the body (in contrast to a rigid body which corresponds to a solid body for which deformation is zero or so small that it can be neglected, regardless of external forces exerted on it).

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

The processing unit can encompass a single processor or multiple processors, which may be located in the same vicinity or may, at least partially, be located in different locations and may be able to communicate together.

The term "non-transitory memory" as used herein should be expansively construed to cover any volatile or non-volatile computer memory suitable to the presently disclosed subject matter.

Figure 1:
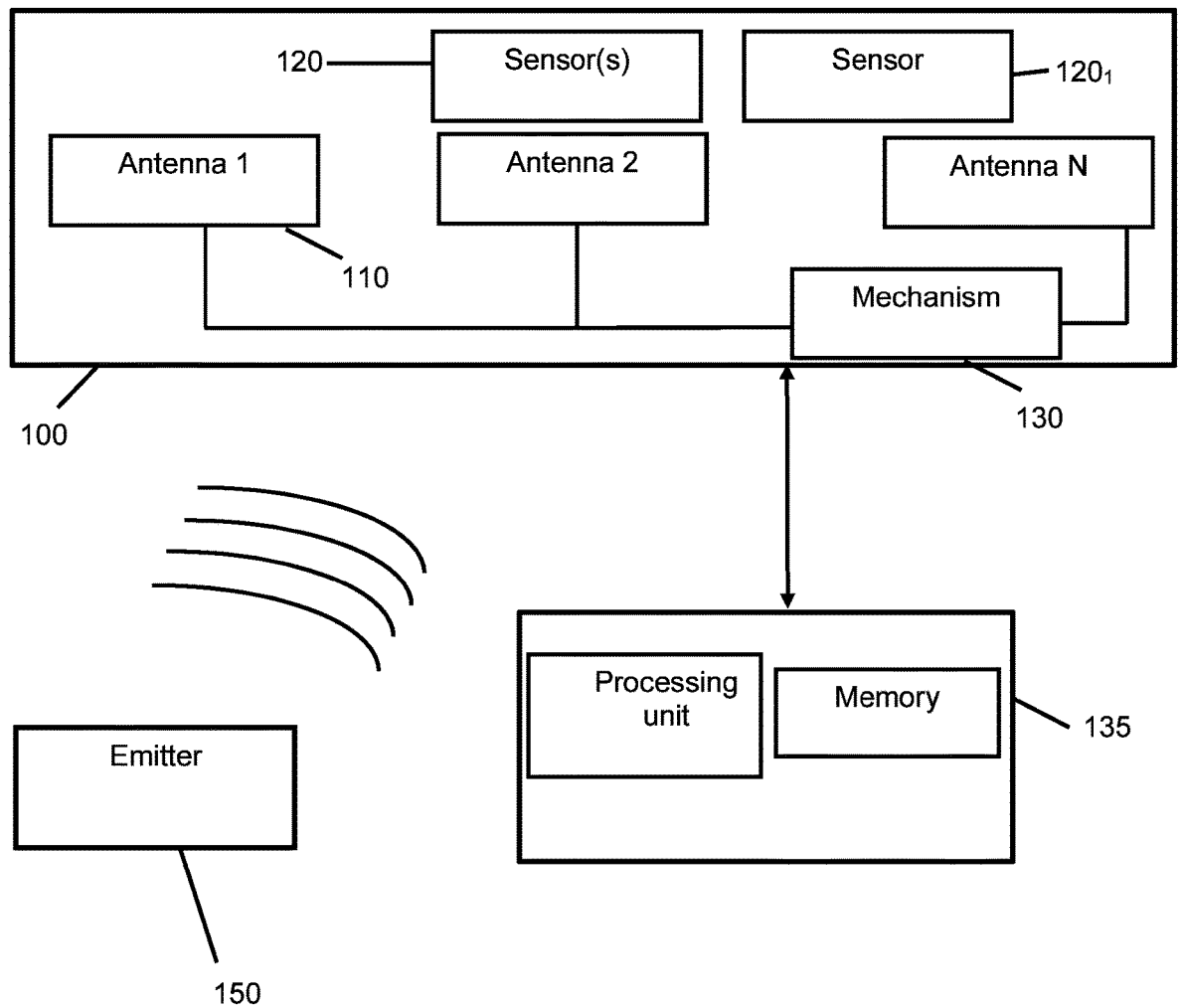
FIG. 1 illustrates an embodiment of a system which can be used to perform one or more of the methods described hereinafter.

FIG. 1 illustrates an embodiment of a system 100 which can be used for determining data pertaining to an emitter 150 of electromagnetic waves (such as, but not limited to, a radio-waves emitter). System 100 can be mounted or affixed to a platform, such as airborne vehicles (e.g. aircrafts, UAV, balloons), space-borne vehicles (e.g. satellite), ground systems, ground vehicles, water-borne vehicles, or other vehicles.

According to some embodiments, system 100 is mounted on a single platform, and can be used e.g. to determine position (this determination is also called "geolocation") and/or direction (this determination is also called "DF" for direction finding) of an emitter. It can therefore be part of, or can constitute, an intra-platform DF/geolocation system (as opposed to inter-platform systems, in which multiple antennas are located on a constellation of different platforms, e.g. satellites).

As shown, system 100 comprises a plurality of antennas 110, each antenna 110 being adapted to intercept electromagnetic waves.

According to some embodiments, one or more of the antennas are attached to the platform, directly or indirectly (e.g. via a cable).

According to some embodiments, some of the antennas 110, or all antennas 110, are affixed to a non-rigid portion of the platform and/or of the system (which is mounted on the platform), and therefore may undergo displacement due to the displacement of the non-rigid portion over time.

According to some embodiments, this displacement (relative to the platform) is due to the non-rigidity of the non-rigid portion, which can cause e.g. flexure and/or distortion and/or vibration of the non-rigid portion.

According to some embodiments, and as explained hereinafter, displacement of the antenna(s) relative to another antenna of the array and/or relative to the platform can be induced purposely.

According to some embodiments, displacement of the antenna(s) relative to another antenna of the array and/or relative to the platform can occur in any direction (three-dimensional displacement).

According to some embodiments, the antennas 110 can be adapted to intercept different frequency ranges, but this is not mandatory.

The plurality of antennas 110 constitute an array of antennas.

System 100 can comprise, or can communicate with, one or more sensors 120.

The sensors 120 can provide data informative of the position of the antennas (all antennas, or at least some of them) over time.

According to some embodiments, sensor $120_1$ is used to provide an absolute position of a given antenna (e.g. relative to a global referential such as Earth—this is however not limitative), and the other sensors 120 are used to provide relative position of the other antennas with respect to this given antenna. Therefore, according to some embodiments, position of all antennas can be determined from the data collected by the sensor $120_1$ and sensors 120.

According to some embodiments, each antenna 110 is associated with a sensor 120, but this is not mandatory, and according to other embodiments, a given sensor 120 can detect positions of a plurality of antennas 110.

According to some embodiments, at least one antenna 110 intercepts data which can be used by a sensor 120 to determine position of this antenna and/or of another antenna. In particular, according to some embodiments, one or more emitter(s) with a known position emit a signal towards the antenna(s) 110. Position of the antenna(s) can therefore be determined, using methods which rely on time difference (TDOA), phase difference (interferometry), etc.

Non limitative examples of sensors that can be used include:
  GPS sensors;
  Differential GPS sensors;
  IMU sensors;
  Laser range finders;
  Optical sensors (e.g. a camera can monitor some features on the antennas, such as a cross mark, or LEDs);
  Radio-receivers; and
  Geo-locating WIFI transmitters.

According to some embodiments, system 100 is used in space and therefore a sensor operative in space is selected (non limitative examples include laser sensors or GPS sensors, but not IMU sensors which are inoperative in space).

According to some embodiments, one or more of the sensors 120 measure also data informative of the velocity, relative to a body-fixed reference frame (this frame is fixed with respect e.g. to the platform), of one or more of the antennas 110. As explained hereinafter, this can be used in particular when Doppler frequency calculation is performed.

According to some embodiments, the sensors 120 can also include one or more attitude sensors. As explained hereinafter, this attitude measurement can be used in the determination of the position of the antennas 110.

Examples of attitude sensors include e.g. star trackers, an inertial measuring unit (IMU), and a plurality of position-determination sensors that are attached at different positions on the antenna, and used to determine the antenna attitude by measuring their absolute positions, or their positions relative to some reference point in the system.

Figure 1A:
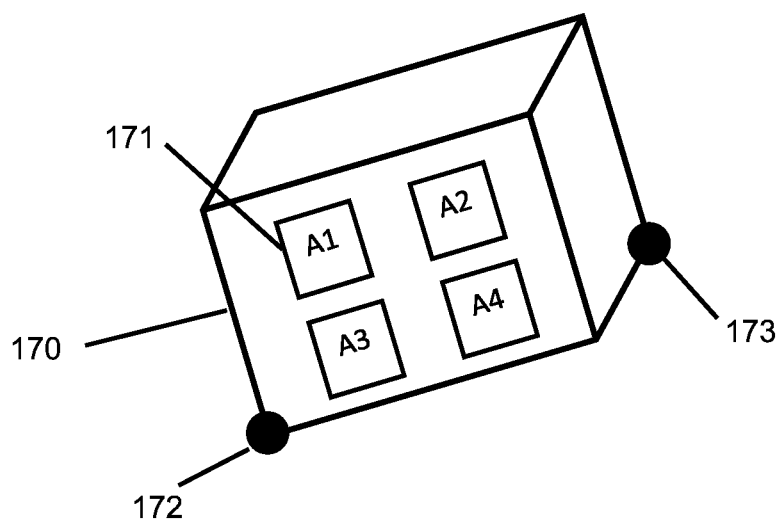
FIG. 1A illustrates an example in which an attitude sensor can be used together with a position sensor to determine position of the antennas.

FIG. 1A illustrates an example in which an attitude sensor can be used together with a position sensor.

As shown in FIG. 1A, an assembly 170 (for example a box) comprises a plurality of antennas 171. A position sensor 172 provides data informative of the position of the assembly 170. An attitude sensor 173 provides data informative of the attitude of the assembly 170. Since position of the antennas 171 with respect to the assembly 170 to which they are affixed is known (these data can be known e.g. from the manufacturing process, and the assembly is a rigid body by itself), absolute position of each of the antennas 171 can be obtained from the position and the attitude of the assembly 170.

According to some embodiments, attitude sensors (or other adapted sensors) can be used to determine orientation of each of a plurality of the antennas. Determining the orientation of each of the plurality of antennas (as well as its time-variation) allows to determine the position/velocity (and orientation) of each antenna. An antenna-rotation mechanism (e.g. a gimbal) can be used for ensuring boresight alignment of the antennas.

In the example of FIG. 1A, since the antennas are attached to a rigid body, determining the orientation of each of a plurality of the antennas (as well as its time-variation) allows to determine the position/velocity (and orientation) of the antennas. According to some embodiments, an antenna-rotation mechanism (e.g. gimbal) is present, which enables using this data in boresight alignment.

As shown in FIG. 1, data informative of the electromagnetic waves intercepted by the antennas 110, and data measured by the sensors 120 can be transferred to a processing system 135. The processing system 135 can comprise a processing unit and a memory (also called processor and memory circuitry).

The processing system 135 can process data measured by the antennas 110 and data measured by the sensors 120 in order to provide data informative of a position and/or of a direction of an emitter (as explained hereinafter).

According to some embodiments, the processing system 135 is located on board, that is to say on the platform (in some embodiments, processing system 135 can be part of system 100, or can correspond to a processing system already present in the platform).

Data informative of the electromagnetic waves intercepted by the antennas 110 and data collected by the sensors 120 can be transferred to the processing system 135, through wire communication (e.g. electric wires and/or optical fibers) and/or through wireless communication (e.g. by radio and/or optical transmission).

According to some embodiments, the processing system 135 is located at a different location than the platform, e.g. at a different spaceborne, airborne, water-borne, land, mobile or non-mobile platform, installation or system. Transmission of data can be performed using an adapted transmitter such as an antenna, or by using an optical and/or laser terminal.

According to some embodiments, processing of the data is performed both by a processing system located on board, and by a processing system located at a different mobile or fixed location.

According to some embodiments, a processing unit and associated memory is part of system 100, and is configured to control mechanism 130, and/or to process data collected by the antennas 110 and/or the sensors 120.

As shown in FIG. 1, according to some embodiments, a mechanism 130, part of the system 100 and/or of the platform, can be used to control at least one of:

motion of at least one antenna of the array of antennas, and/or motion/geometry of the array of antennas 110.

The system 100 can be operatively coupled to the mechanism and can send commands to the mechanism.

According to some embodiments, the mechanism 130 is controllable to displace the array of antennas from a first geometry to a second geometry, different from the first geometry. This enables changing the geometry of the array of antennas in real time during a mission of the platform. In some embodiments, geometry of the array can be changed even during interception of electromagnetic waves by the antennas 100 from the emitter 150.

For example (see e.g. mechanism $130_1$ in FIG. 1B), the first geometry can correspond to a stowed geometry (see reference 190) and the second geometry can correspond to an expanded geometry (see reference 191), or conversely.

In particular, according to some embodiments, the mechanism $130_1$ can be controllable (e.g. by a processing unit of the system 100 and/or of the vehicle) to deploy the array of antennas 100 upon command (and conversely, to transform the array from an expanded state to a stowed state).

For example, in a space vehicle such as a satellite, the array of antennas can be in a stowed state during launch, and in an expanded state when the space vehicle has reached its planned orbit, using mechanism $130_1$.

In another example, the array of antennas is mounted on a drone. The array of antennas is stowed during transit and is deployed when the drone performs its mission.

These examples are not limitative.

According to some embodiments, the mechanism $130_1$ allows increasing the distance between the antennas, so as to expand/deploy the array of antennas. In some embodiments, the mechanism $130_2$ allows decreasing the distance between the antennas, so as to contract the array of antennas.

Figure 1B:
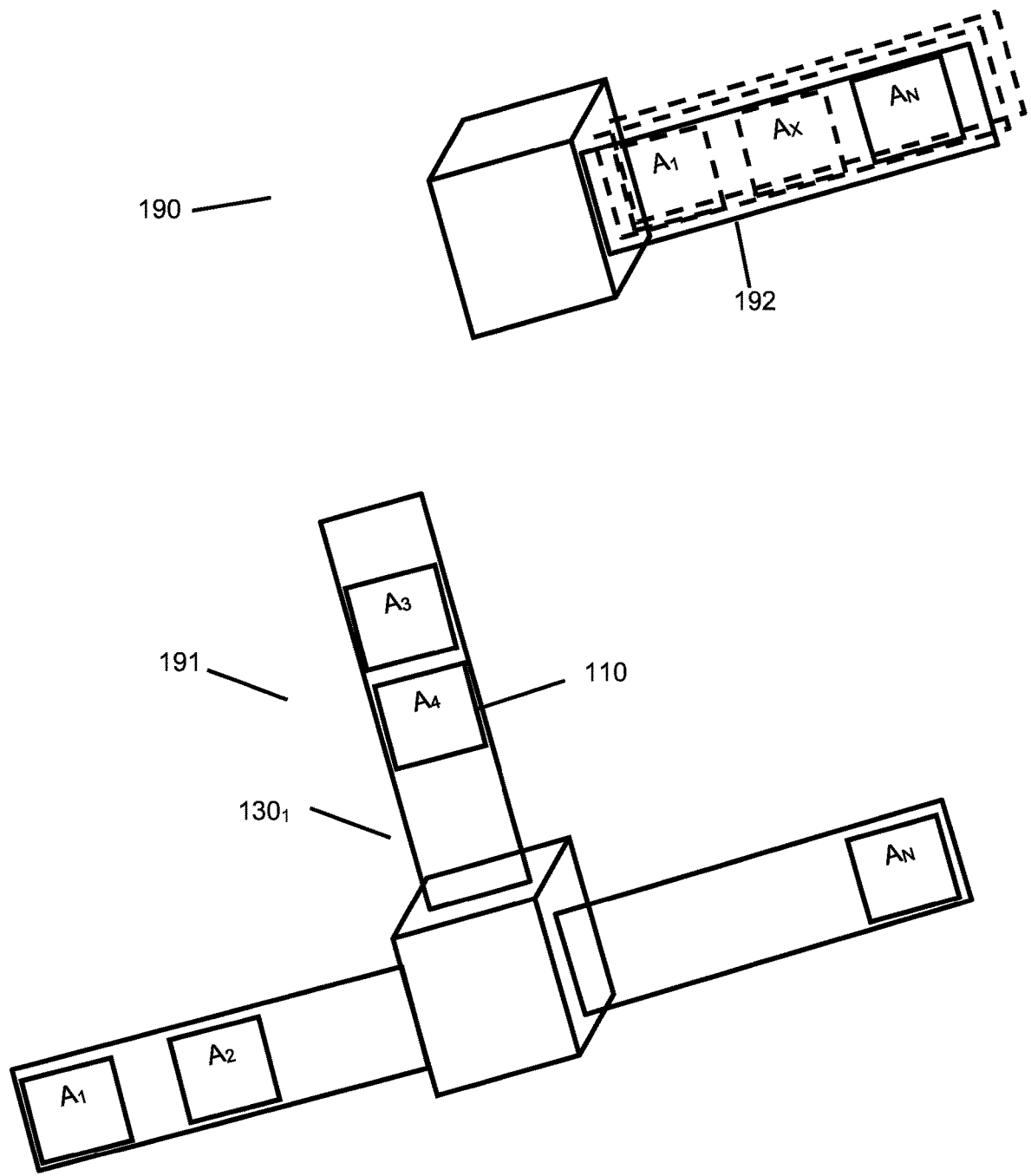
FIG. 1B illustrates a non-limitative example of a mechanism that allows allowing inducing an active motion to one or more antennas of the array of antennas during the mission.

In the non-limitative example of FIG. 1B, the mechanism $130_1$ comprises a plurality of arms 192. When the arms are in a contracted position, the antennas are close one to the other. When the arms are in an expanded position, the distance between the antennas is increased, thereby constituting an array of antennas 110 of a larger dimension. When the arms are in the contracted position, the distance between the antennas is reduced, thereby forming an array of antennas 110 of a smaller dimension.

According to some embodiments, the mechanism 130 can include one or more active actuators, which can be controlled to induce displacement/motion of one or more antennas 110 of the array (in particular relative to another antenna of the array and/or relative to the platform).

According to some embodiments, the actuators can control motion of the antennas along one, two or three axes.

According to some embodiments, the actuators can be controlled by a processing unit of the system or of the platform, and can receive a command to displace one or more antennas of the array relative to another antenna of the array and/or relative to the platform, e.g. in real time during a mission of the platform (and even during interception of electromagnetic waves by the antennas from the emitter).

Examples of actuators include e.g. electric actuators, pneumatic actuators, hydraulic actuators, a motor, a piezoelectric actuation module, a manual rotation module or any other type of controllable actuation module configured to controllably rotate antennas of the array.

Figure 1C:
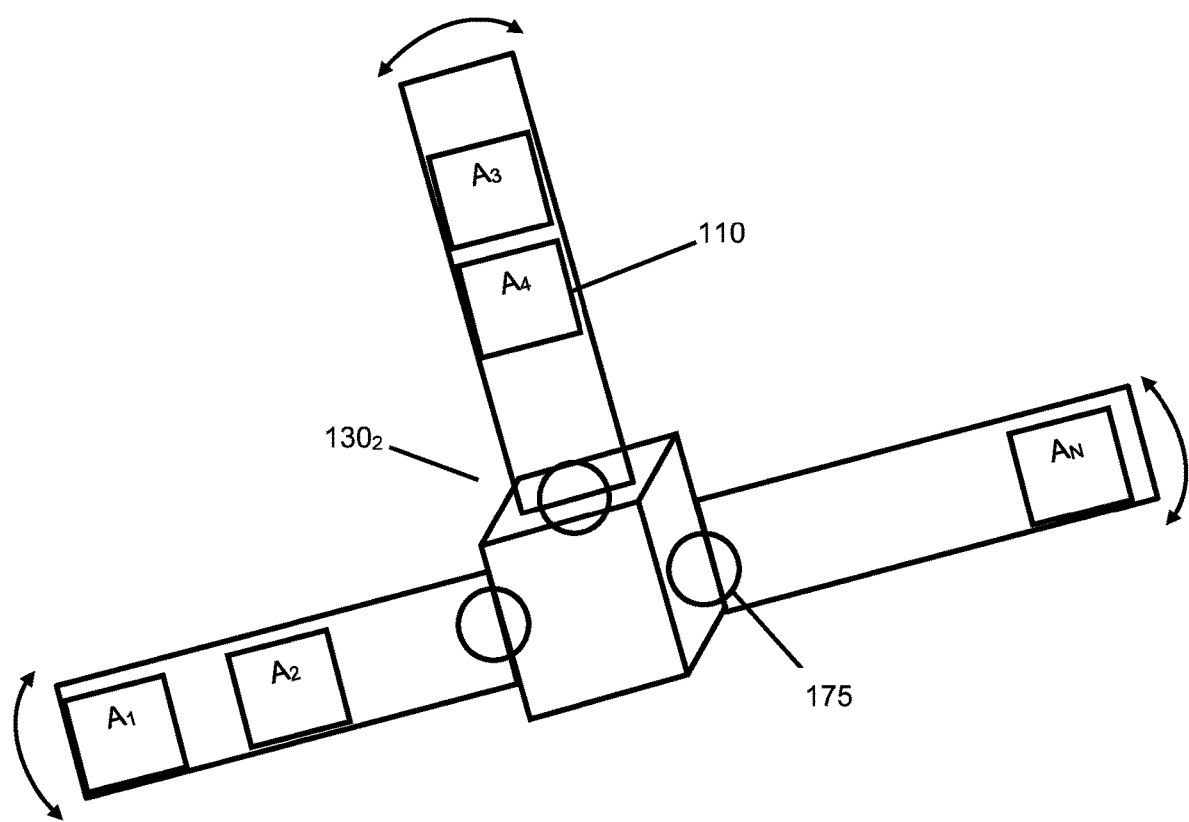
FIG. 1C illustrates a non-limitative example of an array of antennas which is moved from a stowed state to an unfolded state by a mechanism.

In the non limitative example of FIG. 1C, a mechanism $130_2$ includes one or more actuators 175, which can be controlled (e.g. by a processing unit) to induce displacement/motion of one or more of antennas $A_1$ to $A_N$.

According to some embodiments, displacement of a given antenna can be induced by at least one of (i) and (ii):

a mechanism (including e.g. one or more actuators) inducing displacement of the given antenna, and (ii) a displacement of a non-rigid portion (of the system or of the platform) on which the given antennas is located.

According to some embodiments, the mechanism 130 can include one or more non-rigid portions, which can be used to displace the array from a first geometry to a second (different) geometry and/or to induce a displacement of one or more of the antennas of the array of antennas (e.g. relative to another antenna of the array and/or relative to the platform).

Non-limiting examples of such non-rigid portions may be ropes, strings, etc.

Antennas can be affixed to the extremity of the ropes. In a first geometry of the mechanism, the ropes are close to the platform, and in a second geometry of the mechanism, the ropes are released and due e.g. to forces caused by the motion of the platform (e.g. centrifugal forces), the ropes are released or expanded, thereby allowing deployment of the array of antennas.

According to some embodiments, the mechanism 130 can rely on other principles in order to displace at least one antenna relative to the platform, and/or to displace the array of antennas from a first geometry to a second geometry, such as air pressure. For example, a single or a plurality of tubes can be present, and one or more antennas can be displaced using air pressure from a first position to a second position. In other examples, an inflatable device (e.g. airbag, balloon) can be used.

Figure 1D:
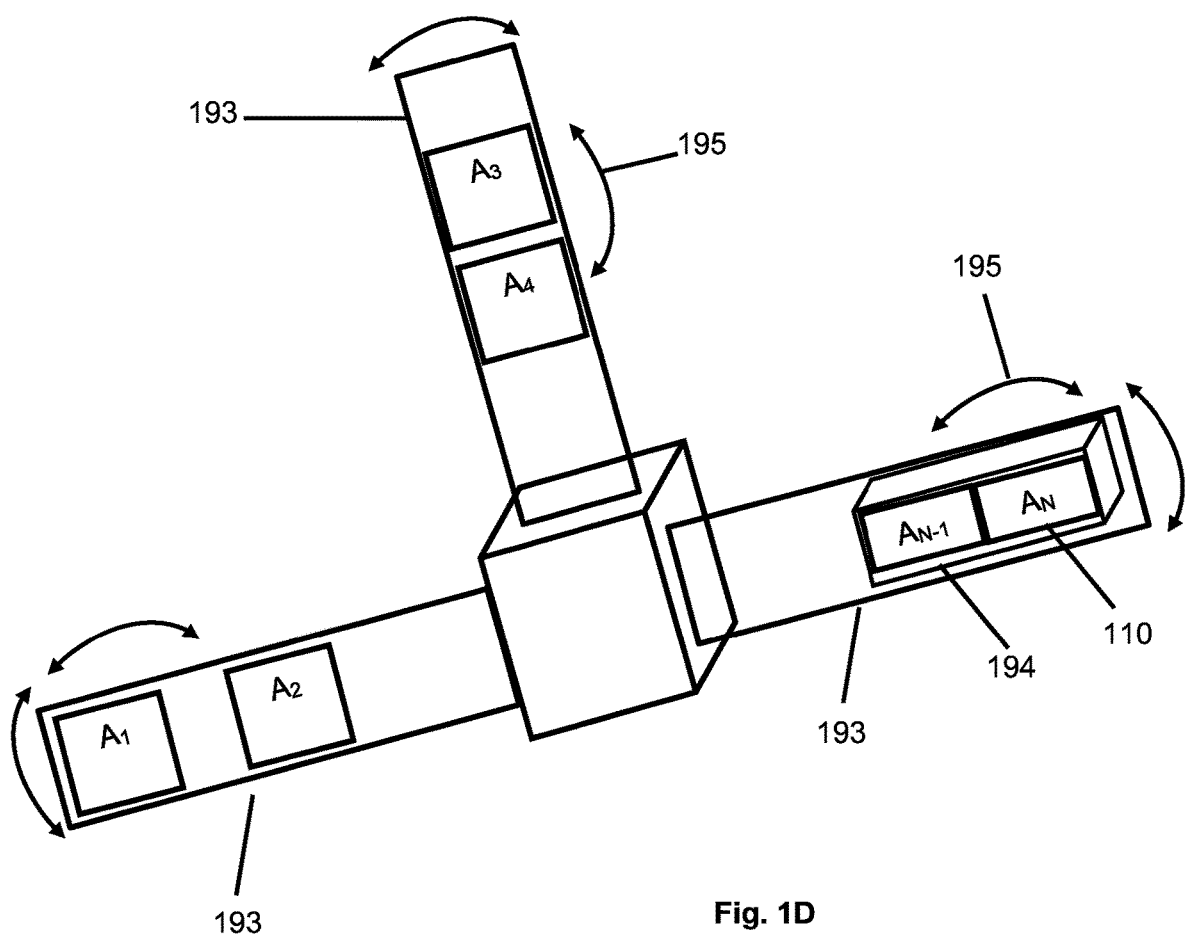
FIG. 1D illustrates a non-limitative example of an array of antennas in which antennas are each mounted on a non-rigid portion (the array is therefore a non-rigid array)

Attention is now drawn to FIG. 1D, which depicts a particular embodiment of the system 100.

As shown, in this embodiment, each of the antennas 110 of the array is (mechanically) linked to a non-rigid portion 193 of the system or of the platform.

For example, the antennas 110 can be affixed to the non-rigid portion 193.

In another example, one or more antennas 110 are affixed to a structure 194 (e.g. a rigid box), which is itself affixed to the non-rigid portion 193. Therefore, displacement of the non-rigid portion 193 relative to the platform induces motion of the structure 194 and therefore of the antennas 110.

As shown, the non-rigid portion 193 can undergo a displacement or flexure 195 due e.g. to deformation and/or vibration and/or motion of the system and/or of the platform.

As a consequence, position of the antennas changes over time, during motion of the platform, but can be determined using the sensors 110 (as explained with reference to FIG. 1).

Figure 2:
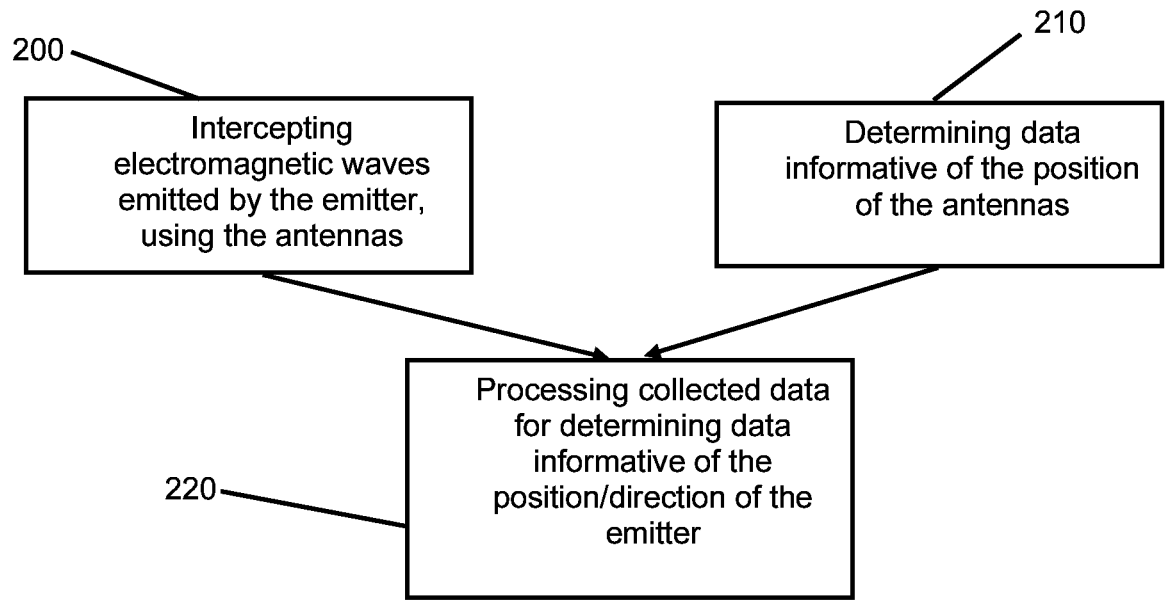
FIG. 2 depicts a method of collecting data for geolocation and/or direction finding of an emitter.

Attention is now drawn to FIG. 2, which depicts a method of collecting data for determining position and/or direction of an emitter. At least some of the operations depicted in FIG. 2 can occur simultaneously.

The method includes intercepting (operation 200) electromagnetic waves emitted by an emitter using the plurality of antennas 110. According to some embodiments, since a relative motion is present between the platform and the emitter (due to a motion of at least one of them relative to the other), a plurality of different measurements is obtained. This is not mandatory, and the platform and the emitter can be fixed relative to the other (if ambiguity is to be resolved, this can be done as explained hereinafter).

If a deployment mechanism is used (see e.g. mechanism 130₁), the plurality of antennas 110 may have been deployed beforehand in order to provide an array of antennas in which the antennas are distanced one from the other, using the mechanism 130₁, as explained above.

The method includes (operation 210) determining data informative of the position of the antennas (of each of the antennas, or at least of a plurality of the antennas). This data can be obtained using the sensors 120.

As mentioned above, the relative position of antennas can vary over time or can be unknown due to various factors, e.g. displacements of non-rigid portions, active motion induced by a mechanism, inaccuracies in the deployment of the array of antennas after launch, etc.

Therefore, over time, the instantaneous positions of the antennas of the array can be determined using data provided by the sensors 120. In some embodiments, the absolute position of one antenna can be determined, and the position of the other antennas relative to this antenna can be determined.

Operation 200 and operation 210 can be performed simultaneously.

The method can include processing (operation 220) collected data (e.g. data informative of the position of the antennas, and data informative of the electromagnetic waves intercepted by the antennas) in order to determine data informative of the position and/or of the direction of the emitter. In some embodiments, and as explained above, processing can be performed e.g. on-board and/or using processing resources of a central station located at a different mobile or fixed location.

According to some embodiments, in addition to estimation of the position of the emitter, data informative of the electromagnetic waves intercepted by the antennas can be used for determining additional inertial data of the emitter, such as velocity or acceleration.

Since an array of at least two antennas which are spaced one from the other intercept electromagnetic waves emitted by the same emitter(s), at least one difference in the physical characteristics of the electromagnetic waves can be measured by two antennas.

The difference in the physical characteristics includes e.g.:

a difference in time of arrival of the electromagnetic waves; and/or a difference in the phase measured between two antennas; and/or a difference in the frequency measured between two antennas.

As explained hereinafter, since the position of each antenna is known at each time (based on the data provided by the sensors 120—as a consequence, it is not required to know in advance position of the antennas), and a difference in the physical characteristics of the electromagnetic waves sensed by the antennas is determined, it is possible to use known algorithms (in particular algorithms used for inter-platform systems) to determine position and/or direction of the emitter.

According to some embodiments, determination of the direction and/or of the position of the emitter can thus be based on the difference of time of arrival of the electromagnetic waves. Indeed, since the difference in time of arrival of the signal to two antennas is related to the direction and the location of the emitter relative to the antenna pair, combination of these measurements can provide estimation of the direction and/or location of the emitter ("TDOA estimation").

Figure 3:
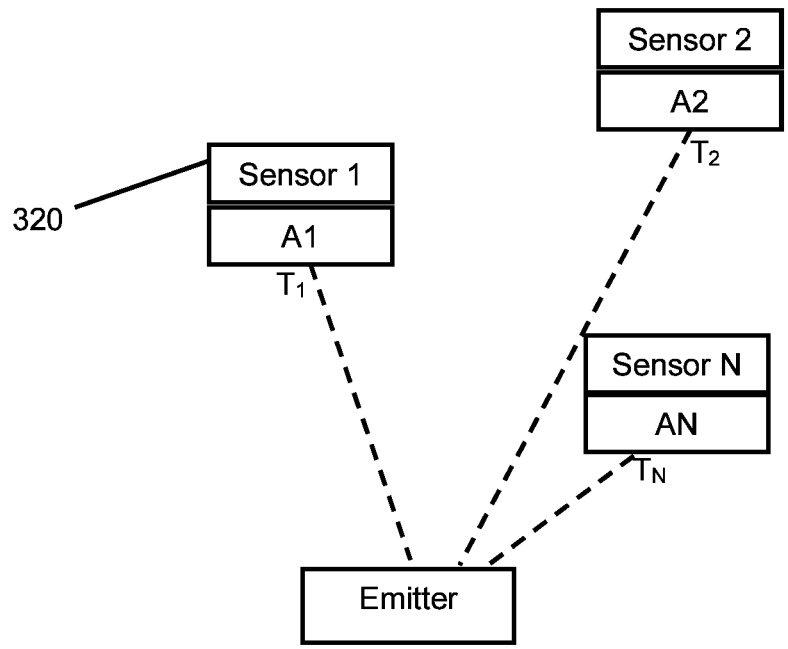
FIG. 3 illustrates an electromagnetic wave arriving at different times to a set of exclusively-positioned antennas.

This is shown in FIG. 3, which illustrates the difference in time of arrival of the electromagnetic waves between the antennas ($T_N < T_1 < T_2$), wherein the position of each antenna is measured using the sensors 320. Generally, the emitter's distance is much greater than distances between the antennas.

The measured difference in time of arrival of the electromagnetic waves, and the measured position of the antennas, provide an estimation of the position and/or of the direction of the emitter.

According to some embodiments, determination of the position of the emitter can be based on the difference of frequency measured at each antenna. In this embodiment, the frequency that is measured at each antenna can be impacted by a differential velocity of the emitter relative to the antennas.

In this embodiment, the differential velocity between the antennas can be measured. Indeed, as mentioned above, it is possible to allow the antennas to undergo unknown random variations in their relative positions, which can cause an unknown differential velocity between the antennas.

A velocity sensor, which is associated with a given location located in a referential moving with the platform, can provide an absolute velocity of this given location, and additional velocity sensors associated with the other antennas can provide differential velocity measurements with respect to the aforementioned given location.

Knowing the position of each antenna, and the velocity of each antenna, the difference in the frequency measured at the plurality of antennas can provide an estimation of the position and/or of the direction of the emitter.

According to some embodiments, determination of the position and/or of the direction of the emitter can rely on interferometry. An example of such a method is described in U.S. Pat. No. 4,975,710.

It is thus possible to determine the position of the emitter although the position of the antennas which sense the electromagnetic waves is perturbed by unknown variations.

According to some embodiments, even if no a priori knowledge of the position of the antennas is available, it is possible to determine the position and/or direction of the emitter.

In addition, it is possible to determine the position of the emitter even if some or all of the antennas undergo a three dimensional displacement (which is unknown in advance), and even if displacement of one or more of the antennas is not repetitive.

Since position over time of the antennas is determined, it is possible to locate each antenna on a non-rigid portion which undergoes a displacement during motion of the platform, even if in a given period of time, this displacement has an amplitude, which is equal to or greater than half a wavelength (or greater than a wavelength) of the electromagnetic waves to be intercepted by the antenna in this given period of time.

In other words, even if this displacement is significant with respect to the wavelength of the electromagnetic waves to be intercepted by the antenna and cannot be considered as negligible, it is possible to determine the position and/or direction of the emitter.

As explained hereinafter (see explanation with reference to FIG. 4), in some embodiments, one or more antennas can be intentionally attached to non-rigid portion of the platform (or of the system), in order to resolve ambiguities which can appear when determination of position and/or direction of the emitter is attempted.

Figure 4:
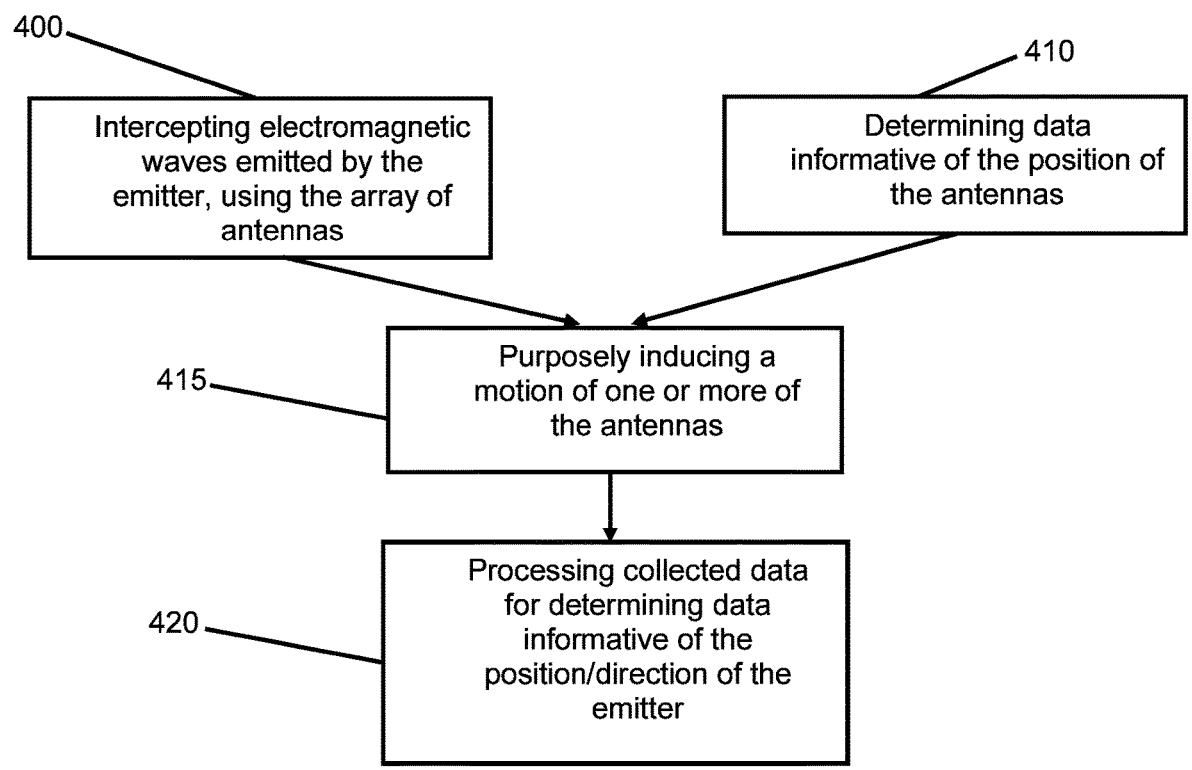
FIG. 4 depicts a method of collecting data for geolocation and/or direction finding of an emitter, in which displacements of at least one antenna is intentionally induced.

Attention is now drawn to FIG. 4.

At least some of the operations depicted in FIG. 4 can occur simultaneously.

The method includes intercepting (operation 400) electromagnetic waves emitted by an emitter using the plurality of antennas 110.

Operation 400 is similar to operation 200.

The method includes (operation 410) sensing data informative of the position of the antennas. This data can be obtained using the sensors 120.

Operation 400 and operation 410 can be performed simultaneously.

The method can comprise inducing (operation 415) a motion of one or more antennas of the array. In particular, the motion of the one or more antennas can be purposely induced. In some embodiments, the motion of the one or more antennas can be induced while the antennas are intercepting electromagnetic waves from the emitter. This is not limitative. In some embodiments, this motion can be induced during periods of time in which the antennas are not intercepting electromagnetic waves from the emitter.

The motion can be a periodic motion, or a secular motion, or even a random motion.

According to some embodiments, the motion enables at least one of (i) and (ii):
 displacement of at least one antenna of the array relative to at least another antenna of the array;
 (ii) displacement of at least one antenna of the array is induced in a reference frame which is linked to a body of the platform. In other words, one or more antennas are moved over time relative to the platform.

Operation 415 can include sending a command to a mechanism operative to modify a position of the antenna(s) over time. This command can be sent e.g. a processing unit and associated memory of the system 100 and/or of the platform.

Various examples of mechanism(s) have been described above, and can be used in this method.

For example, if the mechanism comprises arms, the method can comprise making the arms oscillate, by using e.g. a mechanical actuator which controls motion of the arms. This is not limitative and other motions can be induced depending on the mechanism which is used.

According to some embodiments, an amplitude of the motion which is induced for a given antenna during a given period of time is equal to or greater than half a wavelength (or a wavelength) of the electromagnetic waves to be intercepted by the given antenna during this given period of time. In other words, the amplitude of the motion is not negligible with respect to the characteristics of the measured signal which are pertinent to determine location and/or direction of the emitter.

Operations 400, 410 and 415 can be performed simultaneously.

The method can comprise processing (operation 420) collected data for determining data informative of the position and/or of the direction of the emitter. Operation 420 is similar to operation 220 above. Position and/or direction of the emitter can be determined even in periods of time in which one or more antenna(s) is moved relative to the other and/or relative to the platform.

When determining position and/or direction of the emitter (using e.g. TDOA, FDOA, etc. as already explained above), a number of positions/directions may fit the data with similar goodness, thereby obscuring the correct position/direction. This is generally referred to as "ambiguous solutions", or "ambiguity".

As explained with reference to operation 415, a motion of the antenna(s) is induced. Therefore, geometry of the problem changes over a plurality of consecutive time intervals, thereby increasing the goodness of the correct solution and attenuating the goodness of the ambiguous solutions, thus enabling resolving ambiguity.

In other words, motion of the antennas is beneficial and may therefore be purposely provoked for determining the position of the emitter.

In the method of FIG. 4, it has been described that motion of the antenna(s) is purposely induced (e.g. by sending a command to an adapted mechanism).

According to some embodiments, one or more antenna(s) are intentionally located on a non-rigid portion (of the platform or of the system). It is therefore not necessary to purposely induce motion of the antenna(s) by sending a command to a mechanism, since displacement of the non-rigid portion induces displacement of the antenna(s) (this displacement can occur while the antennas are intercepting electromagnetic waves from the emitter). It has been mentioned above that motion of the antenna(s) can be used to resolve ambiguities. Similarly, the displacement of the antenna(s) due to the displacement of the non-rigid portions can be used as explained above to resolve ambiguities.

Since the sensors 120 measure at each time the position of the antennas, it is not necessary to determine in advance the specifics (e.g. amplitude, variation, etc.) of the displacement of the non-rigid portion(s).

An additional benefit of the method includes the fact that the accuracy of the mechanism which is used to displace the one or more antenna(s) can be low and/or unknown.

According to some embodiments, the system is configured to send a command to the mechanism to displace at least one antenna of the array from a current position to a specified position, wherein an error between a position reached by the antenna and the specified position is equal to or greater than half a wavelength (or a wavelength) of the electromagnetic waves to be intercepted by said at least one antenna. In other words, even if the inaccuracy of the mechanism is significant with respect to the characteristics of the measured signal which are pertinent to determine location and/or direction of the emitter, it is possible to determine position and/or direction of the emitter.

Figure 5:
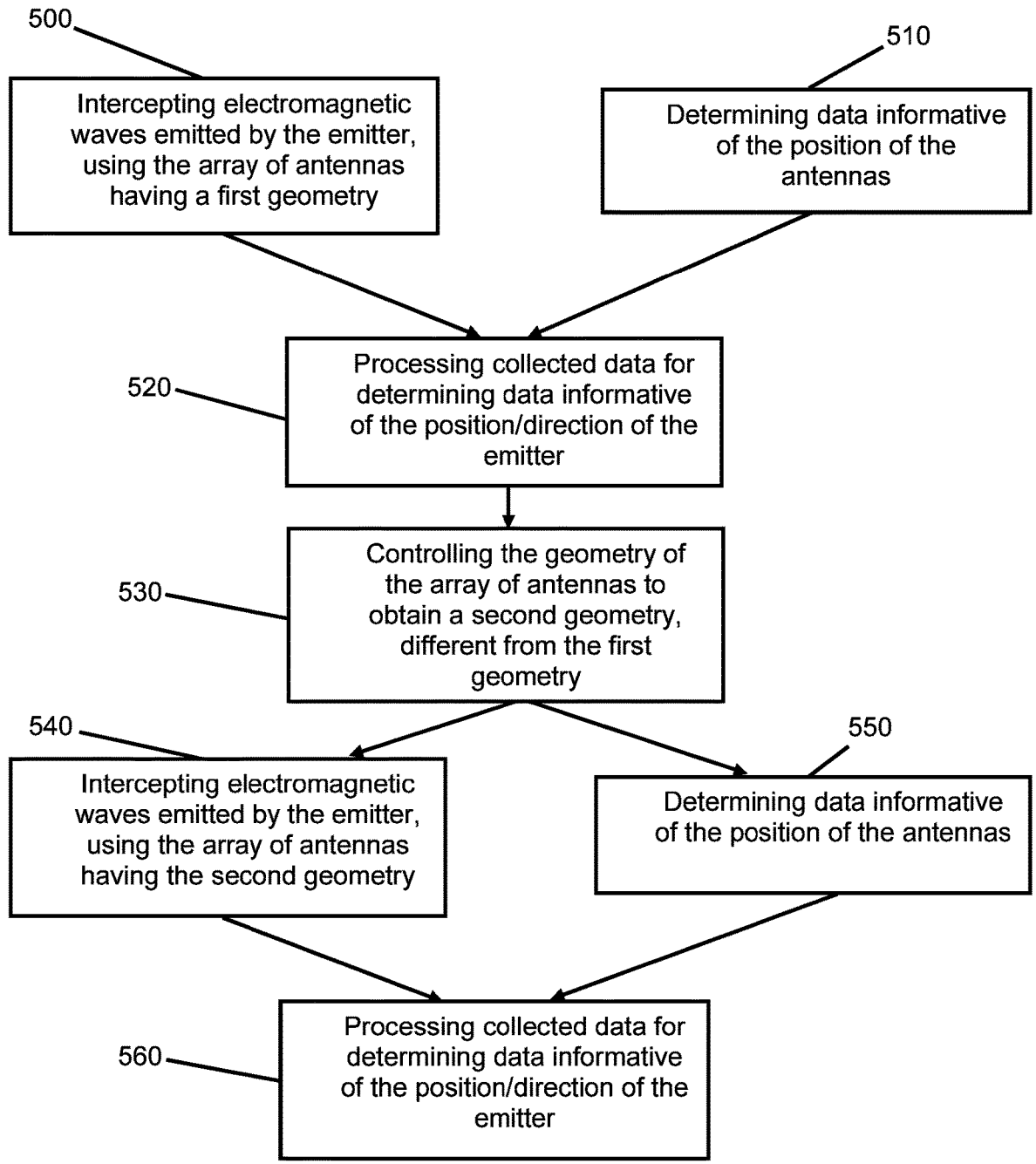
FIG. 5 is a non-limitative example of the method of FIG. 4, wherein a geometry of the array of antennas is modified over time.

Attention is now drawn to FIG. 5, which describes a specific embodiment of the method of FIG. 4.

In the method of FIG. 5, a geometry of the array of antennas is controlled to be modified over time. This modification can be performed e.g. using a mechanism as described above (see e.g. non limitative example depicted in FIG. 1B, or other mechanisms described above).

The method includes intercepting (operation 500) electromagnetic waves emitted by the emitter, using the array of antennas having a first geometry.

Operation 500 is similar to operation 200 and is not described again.

The method includes measuring (operation 510) data informative of the position of the antennas.

Operation 510 is similar to operations 210, 410 and is not described again.

Operation 500 and operation 510 can be performed simultaneously.

The method includes processing (operation 520) collected data for determining data informative of the position and/or direction of the emitter.

Operation 520 is similar to operations 220, 420 and is not described again.

The method includes controlling (operation 530) the geometry of the array of antennas to attain a second geometry, different from the first geometry. The second geometry of the array can differ from the first geometry of the array e.g. by its shape, dimensions, etc.

For example, if the mechanism comprises arms (see e.g. FIG. 1B) that can be folded (and respectively unfolded), the method can comprise folding at least one of the arms, or further unfolding at least one of the arms. The arms can comprise e.g. various foldable elements allowing folding/unfolding at various distances.

These are non limitative examples, and other operations can be performed, depending on the nature of the mechanism. Various examples have been described above for the mechanism, which can be used in this method.

According to some embodiments, a first mechanism can be used to first deploy the array of antennas (e.g. in the case of a satellite, once it has reached its orbit), and a second mechanism can be used to modify the geometry of the array of antennas over time.

Operation 530 can be performed during motion of the platform on which the array of antennas is located. Operation 530 can be performed even during a given period of time in which the antennas of the array intercept electromagnetic waves transmitted by the emitter. Position and/or direction of the emitter can be determined even in this given period of time in which the geometry of the array is modified.

Figure 6:
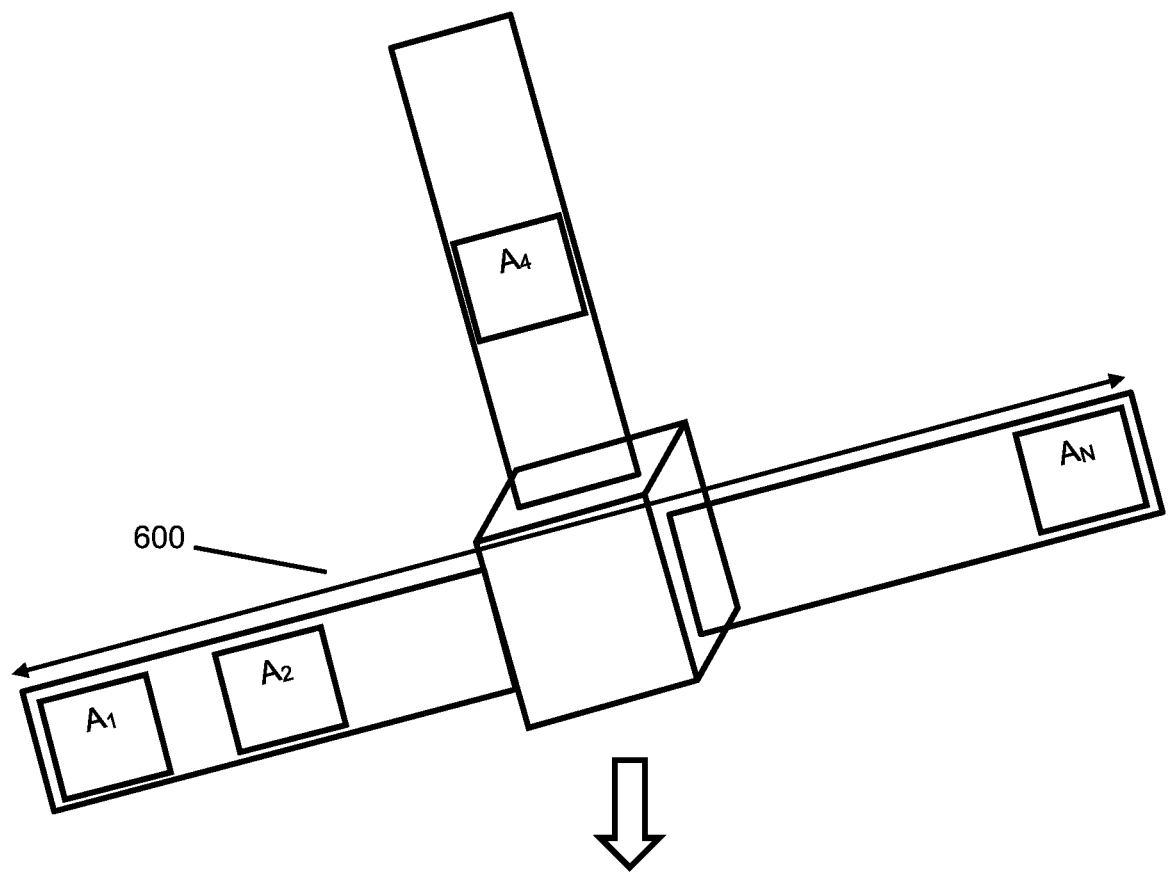
FIG. 6 is an example of the method of FIG. 5.
Figure 6:
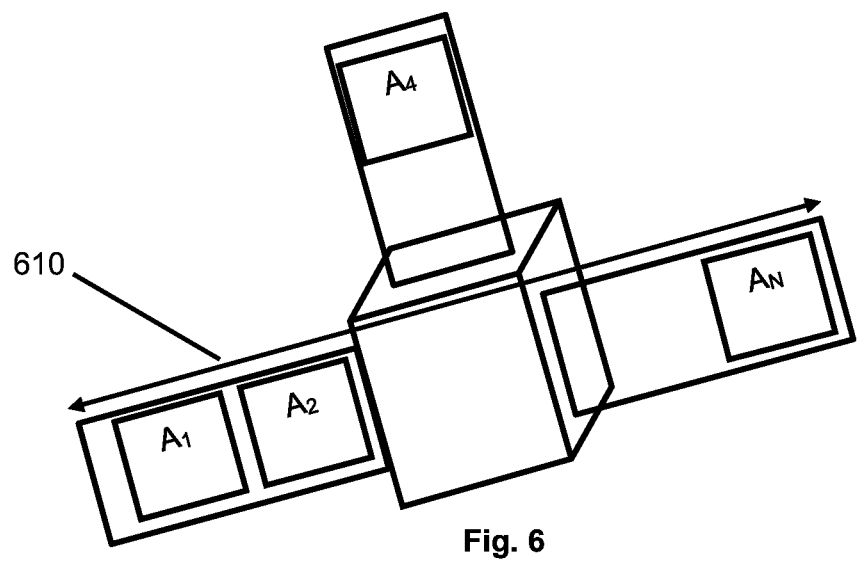

A non-limitative example of operation 530 is provided in FIG. 6. In the first geometry, the distance between two extreme opposite antennas is D1 (see reference 600), and in the second geometry, the distance between two extreme opposite antennas is D2 (see reference 610), wherein $D2 \ll D1$.

The method of FIG. 5 includes intercepting (operation 540) electromagnetic waves emitted by the emitter, using the array of antennas in the second geometry. Operation 540 is similar to operation 500.

The method includes determining (operation 550) data informative of the position of the antennas. Operation 540 and operation 550 can be performed simultaneously.

Operation 550 is required since the position of the antenna(s) has been changed following modification of the geometry of the array of antennas.

The method includes processing (operation 560) collected data to determine data informative of the position and/or of the direction of the emitter.

Operation 560 is similar to operation 520 and is not described again.

According to some embodiments, since the position of each antenna of the array is derived using sensors, it is possible to use a mechanism which upon command, changes the geometry of the array from a first geometry to a second geometry with a low and/or unknown accuracy.

With such a mechanism, although the specified position of the antennas in the second geometry can be known (since it is provided as an input of the control loop of the mechanism), the real position of the antennas in the second geometry can differ from the specified position. Lastly, unknown displacements can affect positions of the antennas.

Even in this configuration, since sensors are provided to measure position of the antennas, it is possible to accurately determine the real position of the antennas.

In some embodiments, it is possible to have a mechanism in which the position of a deployed antenna deviates from the desired position by half a wavelength (or a wavelength) of the measured signal, or more. Even with a mechanism with such a low accuracy, it is possible to determine position and/or direction of the emitter, as explained above.

Modification of the geometry of the array of antennas can be performed for various reasons.

The accuracy for determining the position and/or direction of the emitter is generally proportional to the size of the array of antennas. The larger the array of antennas, the higher the accuracy. In some embodiments, during a mission, it can be requested to obtain a first accuracy during a first period of the mission, and to obtain a second accuracy, different from the first one, during a second period of the mission. Therefore, size of the array can be modified accordingly from a first size, adapted to the first accuracy, to a second size, adapted to the second accuracy.

The accuracy for determining the position and/or the direction of the emitter depends also on the frequency of the electromagnetic waves. For a given size of the array of antennas, a better accuracy is obtained for high frequency than for low frequency.

Therefore, according to some embodiments, size of the array can be modified accordingly from a first size adapted to a first frequency of waves to be sensed, to a second size adapted to the second frequency of waves to be sensed.

The size of the array influences also the probability of occurrence of ambiguous solutions of the position and/or direction of the emitter. The larger the size of the array, the greater the probability of ambiguity, but the higher the accuracy.

In some embodiments, the geometry of the array can be modified while the antennas of the array are intercepting electromagnetic waves from the emitter, similarly to FIG. 4. This enables solving ambiguity as explained with reference to FIG. 4.

Modification of a geometry of the array can be performed in response to other constraints, such as environmental conditions, overcoming multi-path reflections, required accuracy, required limit of the probability of ambiguity, stealth, etc.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system adapted to be mounted on a platform, the system comprising:
    an array of antennas suitable for intercepting electromagnetic waves; and
    one or more sensors, wherein said one or more sensors are configured to provide data informative of a position of each of a plurality of the antennas of the array over time;
    wherein each of the plurality of the antennas is linked to a non-rigid portion, thereby undergoing displacement upon displacement of the non-rigid portion wherein the displacement of one or more of the antennas linked to a non-rigid portion is an unpredictable three-dimensional motion;
    wherein data informative of the electromagnetic waves intercepted by the array and data informative of the position of the plurality of antennas over time are usable for determining data informative of at least one of a position or a direction of at least one emitter of the electromagnetic waves.

2. The system of claim 1, wherein the one or more sensors are operative in space.

3. The system of claim 1, wherein at least one of the one or more sensors is configured to provide data informative of a position of an antenna based on data informative of the electromagnetic waves intercepted by said antenna.

4. The system of claim 1, wherein each antenna of the array of antennas is linked to a non-rigid portion.

5. The system of claim 1, wherein a displacement of a non-rigid portion to which an antenna is linked has an amplitude, during a given period of time, which is equal to or greater than half a wavelength of the electromagnetic waves to be intercepted by the antenna during said given period of time.

6. The system of claim 1, wherein a mechanism allows control of a motion of one or more of the plurality of antennas, wherein the system is configured to induce, by the mechanism, a motion of one or more of the antennas over time.

7. The system of claim 1, operatively coupled to a mechanism controllable to displace the array of antennas from a first geometry to a second geometry, different from the first geometry.

8. The system of claim 1, configured to send a command to a mechanism to displace the array of antennas from a first geometry to a second geometry, different from the first geometry, wherein an error in a position of at least one antenna in the second geometry, with respect to a position of said at least one antenna specified in the command, is equal to or greater than half a wavelength of the electromagnetic waves to be intercepted by said at least one antenna.

9. The system of claim 1, operable to communicate with a processing unit configured to determine at least one of a position and direction of at least one emitter of the electromagnetic waves based on:
    a difference between at least one of the physical characteristics of the electromagnetic waves intercepted by the plurality of antennas; and
    data informative of the position of each antenna over time.

10. The system of claim 1, wherein the platform includes at least one of an airborne vehicle, a space-borne vehicle, a ground system, a ground vehicle, and a water-borne vehicle.

11. A system adapted to be mounted on a platform, the system comprising:
    an array of antennas suitable for intercepting electromagnetic waves, wherein the system is operatively coupled to a mechanism controllable to displace at least one antenna of the array relative to another antenna of the array or relative to the platform, according to an unpredictable three-dimensional motion; and one or more sensors, wherein said one or more sensors are configured to provide data informative of a position over time of each of a plurality of the antennas;

wherein data informative of the electromagnetic waves intercepted by the array and data informative of the position of the plurality of antennas over time are usable for determining data informative of at least one of a position or a direction of at least one emitter of the electromagnetic waves.

12. The system of claim 11, configured to send a command to the mechanism to displace at least one antenna of the array relative to another antenna of the array or relative to the platform.

13. The system of claim 12, configured to induce, by the mechanism, a periodic or secular motion of one or more of the antennas, to resolve an ambiguity present in determining data informative of at least one of a position and a direction of the at least one emitter of the electromagnetic waves.

14. The system of claim 11, configured to send a command to the mechanism to displace at least one antenna of the array from a current position to a position specified in the command, wherein an error between a position reached by the antenna and the position specified in the command is equal to or greater than half a wavelength of the electromagnetic waves to be intercepted by said at least one antenna.

15. The system of claim 11, configured to send a command to the mechanism to displace the array of antennas from a first geometry to a second geometry, different from the first geometry.

16. The system of claim 11, wherein at least one antenna of the array of antennas is linked to a non-rigid portion, thereby undergoing displacement upon displacement of the non-rigid portion.

17. The system of claim 11, wherein no a priori knowledge of the position of the antennas of the array of antennas is available to determine at least one of the position or the direction of the emitter.

18. The system of claim 11, wherein at least one of (i) or (ii) is met:
   (i) one or more of the antennas undergo a displacement which is unknown in advance; or
   (ii) one or more of the antennas undergo a displacement which is not repetitive.

19. A non-transitory computer readable medium comprising instructions that, when executed by one or more processing units, cause the one or more processing units to:
   obtain data informative of electromagnetic waves intercepted by an array of antennas mounted on a platform, wherein each of a plurality of the antennas is linked to a non-rigid portion, thereby undergoing displacement upon displacement of the non-rigid portion, wherein the displacement of one or more of the antennas linked to a non rigid portion is an unpredictable three-dimensional motion;
   obtain data informative of a position of each of the plurality of the antennas over time; and
   based on the data informative of the electromagnetic waves intercepted by the array of antennas and the data informative of the position of the plurality of antennas over time, determine data informative of at least one of a position or a direction of at least one emitter of the electromagnetic waves.

* * * * *